United States Patent [19]
Rosenberg

[11] 3,710,942
[45] Jan. 16, 1973

[54] VALVE FOR FLUID LINES AND STRUCTURES CONTAINING THE SAME

[75] Inventor: David Rosenberg, Glen Cove, N.Y.

[73] Assignee: Pall Corporation, Glen Cove, N.Y.

[22] Filed: June 29, 1970

[21] Appl. No.: 50,686

Related U.S. Application Data

[63] Continuation-in-part of Ser. No. 643,083, June 2, 1967, Pat. No. 3,447,478, and a continuation-in-part of Ser. No. 710,609, March 5, 1968, Pat. No. 3,572,375, and a continuation-in-part of Ser. No. 787,539, Dec. 27, 1968, abandoned, and a continuation-in-part of Ser. No. 1,499, Jan. 8, 1970, Pat. No. 3,650,093.

[52] U.S. Cl. ............................. 210/136, 137/525.1
[51] Int. Cl. ..................................... B01d 35/02
[58] Field of Search......210/136, 428, 430, 432, 446, 210/350, 356, 131, 130, 416; 137/525, 525.1; 251/337

[56] References Cited

UNITED STATES PATENTS

| 3,386,470 | 6/1968 | Goda et al. | 137/525 X |
| 3,192,949 | 7/1965 | DeSee | 251/337 X |
| 2,328,948 | 9/1943 | Bourke | 137/525.1 X |
| 2,637,413 | 5/1953 | Fox et al. | 137/525.1 X |
| 2,896,840 | 7/1959 | Hendry | 210/416 X |
| 3,566,964 | 3/1971 | Livingston | 137/525.1 X |
| 3,572,375 | 3/1971 | Rosenberg | 137/525.1 X |

Primary Examiner—Frank A. Spear, Jr.
Attorney—Janes & Chapman

[57] ABSTRACT

A valve is provided for use in fluid lines as a relief valve and in T-connectors with syringes and like injecting devices in the administration of medicaments, to supply or withdraw fluids in a volume greater than the capacity of the syringe.

41 Claims, 6 Drawing Figures

VALVE FOR FLUID LINES AND STRUCTURES CONTAINING THE SAME

This application is a continuation-in-part of applications serial Nos. 643,083, filed June 2, 1967, now U.S. Pat. No. 3,447,478, patented June 3, 1969 and Ser. No. 710,609, filed Mar. 5, 1968 now U.S. Pat. No. 3,572,375, patented Mar. 23, 1971, and a continuation-in-part of Ser. No. 787,539, filed Dec. 27, 1968, and now abandoned; and a continuation-in-part of Ser. No. 1,499, filed Jan. 8, 1970, now U.S. Pat. No. 3,650,093, filed Mar. 21, 1972.

Syringes are widely used in medicine for the injection of fluids into the body, or for withdrawal of fluids from the body. Frequently, the volume of fluid that is to be injected or withdrawn is greater than the available capacity of the syringe. This requires two or more injections or withdrawals, with a corresponding number of insertions of the syringe needle into the body.

In order to avoid this problem, Y-couplings have been provided, such as are described in U.S. Pat. No. 986,263 to Bevill, patented Mar. 7, 1911, which permits the connection of the syringe to an additional reserve container. The coupling is provided with valves, to regulate the flow of fluid in the proper direction, and prevent any backflow thereof, and these valves are connected with the Y-coupling by a section of flexible tubing. This device is large and clumsy, however, and has never been widely employed, partly because it is really only useful with syringes of very large volume, whereas the problem most frequently is encountered when the syringes have a very small volume. In such cases, the Bevill device is virtually useless.

In accordance with the invention, a valve is provided which is useful in fluid lines to close off flow, but is adapted to open whenever fluid pressure upstream of the valve exceeds a predetermined minimum. Such a valve is useful as a relief valve, or as a check valve, to control flow in the line according to forward fluid pressure.

The valve comprises a valve member movable between open and closed positions, and a foam spring tending to hold the valve member in the closed position, and resiliently resisting opening of the valve member until a predetermined forward fluid pressure is reached.

This valve is particularly adapted for use as a check valve in a T-connector. Accordingly, further in accordance with the invention, a T-connector valve is provided, which combines in one unit a coupling body having three passages therethrough that are interconnected, and a check valve in at least one and preferably check valves in two of the passages, ensuring that flow of fluid through such passage proceeds only in one direction, each check valve having a valve member resiliently held in a closed position by a foam spring, which tends to hold the valve snugly closed. The T-connector is in one unit, having one or a plurality of parts that are fitted and secured together in a unit construction, with the valve or valves fixed in the passage or passages therein in a leak-tight manner, and lends itself to fabrication by molding or casting to a predetermined shape. This not only simplifies the manufacture of the T-connector valve, but also makes it suitable for mass production, and thus reduces its cost to a minimum.

In a preferred embodiment of the device, the coupling is made entirely of plastic, with the exception of the check valves, which can be of a plastic or rubber material, and the plastic components of the coupling are all united together, with the check valves locked in position, and with mating and/or standard fittings, joints or sockets in each of the three passages, for coupling thereof to a syringe of conventional construction, a delivery means, and a receptable or fluid supply. A preferred type of mating joint or socket is a Luer fitting or Luer-Lok.

The invention accordingly provides a T-connector valve for coupling a syringe to a liquid medicament supply, for delivery to a body via a fluid delivery device of a volume of liquid medicament in excess of the capacity of the syringe, comprising, in combination, a coupling body having three interconnected passages therethrough, a check valve in at least one of said passages controlling flow of fluid therethrough in a single direction, via a valve member movable between open and closed positions, a foam spring biasing the valve member towards a closed position, and means at an outer portion of each passage adapted for connection of said passage and the coupling to at least one member selected from the group consisting of a liquid medicament supply container, a fluid delivery device, and a syringe, the body being formed of plastic and holding the valve therein as one unit.

A feature of the T-connector valve according to the invention is its extremely small internal volume of fluid retention. This is usually less than 1 cc., and is preferably less than 0.1 cc. This means that quite high operating pressures can be achieved using conventional medical syringes, and also that very little of the fluid being delivered or withdrawn is wasted within the T-connector.

A further feature is that it can be made of a rigid, non-pressure-deformable material, which means that none of the available fluid pressure delivered via the syringe is lost in distending the connector.

In the drawings, like numbers refer to like parts.

Figure 1:
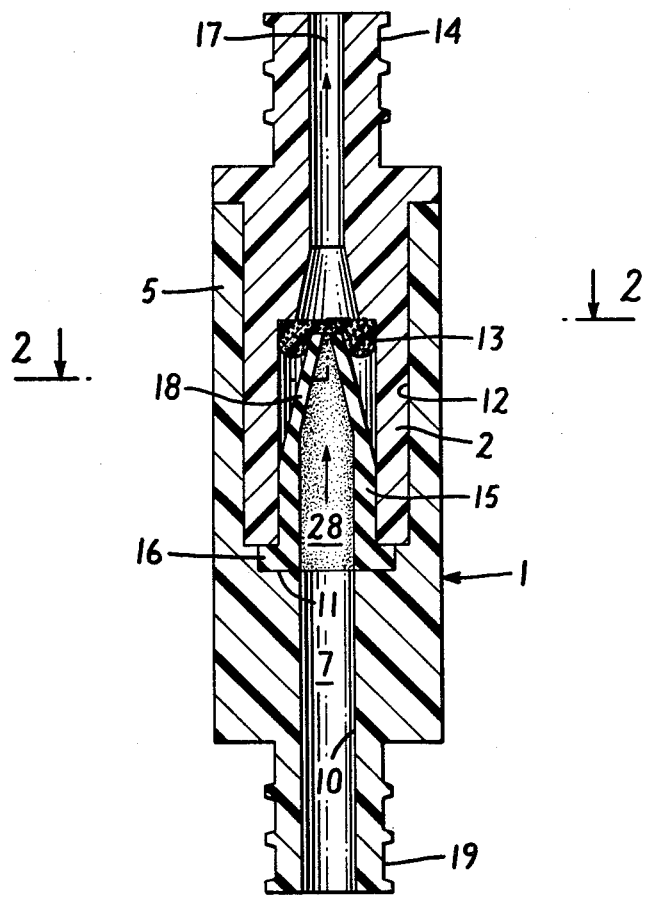
FIG. 1 is a view in cross-section of a typical relief valve in accordance with the invention, employing one duckbill check valve.
Figure 2:
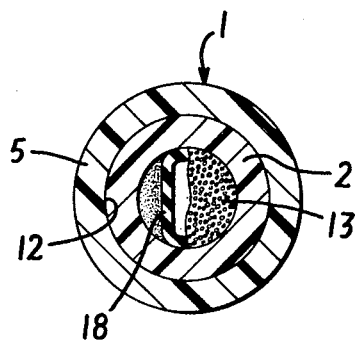
FIG. 2 is an end view, taken along the line 2—2 of FIG. 1, and looking in the direction of the arrows.

The relief valve shown in FIGS. 1 and 2 has a housing 1 that is molded in one piece entirely of plastic material, in this case, a polycarbonate resin, sold commercially under the trade name LEXAN However, other thermoplastic or thermosetting moldable or castable plastic materials can be employed, such as ethyl cellulose, cellulose acetate-butyrate, cellulose propionate, nylon, polyphenylene oxide (Noryl), polyethylene, polypropylene, polytetrafluoroethylene (Teflon), polychlorotrifluoroethylene (Kel-F), polystyrene, polyvinyl chloride, polycarbonates, polyoxymethylene (Delrin), epoxide resins, urea-formaldehyde, melamine-formaldehyde, phenol-formaldehyde, 2-methylpentene polymers, (TPX), and polyester resins.

The value body constitutes a unit made in two pieces, the housing 1, and a fitting insert 2 which, as shown in the Figures, are bonded together by softened integration of the plastic, at their adjoining contacting surfaces. The housing 1 has a central passage 7 at the inner end of which is a reentrant portion 10 that defines a valve seat 11. Beyond the valve seat 11 is a wide bore 12 that extends to the exterior of the housing. A check valve 15 of the duckbill type is placed at the inner end of the bore 12 with the valve member in the form of duckbill 18 facing outwardly from the valve seat 11, and with a base flange 16 abutting against the valve seat 11 in a leak-tight seal. The valve can be of any resilient or flexible heat-, water-, and solvent-resistant material, such as natural or synthetic rubber, for example, neoprene, or butadiene-styrene-acrylonitrile polymer, polypropylene, polyethylene, ethylene-propylene polymers, polyvinyl chloride or rubber hydrochloride resin. The base flange 16 of the valve is locked in position in the valve seat 11 by the fitting insert 2, which fits snugly in the bore 12 with its external wall bonded thereto by way of softened integration of the plastic.

It will be appreciated that the fitting insert 2 can also be held in the bore 12 by a press fit, and it can also be bonded therein by a suitable binder. The sides of the bore can be threaded, and the fitting insert 2 correspondingly threaded, so that it can be screwed tightly into the bore, in which event the check valve 15 can be removed for replacement. In the preferred embodiment, however, the fitting 2 is permanently fixed in the bore 12. In all cases, the fitting holds the flange 16 of the valve 15 tightly against the valve seat 11 in a leak-tight seal.

The duckbill 18 is snugly enclosed in a foam spring 13, which is of a resilient open cell foam sheet material, with through pores, such as foam rubber, styrene-acrylonitrile rubber foam, polyethylene foam, polypropylene foam, silicone rubber foam, nylon foam, polyvinyl chloride foam, or polyether-based or polyester-based polyurethane foam. This spring tends to hold the duckbill closed snugly, and it can open only by a forward fluid pressure sufficient also to compress the sponge, thus providing a higher fluid opening pressure than would otherwise be the case, and aiding in preventing leakage through the valve. The foam is highly porous, with through pores, of the order 0.005 to 0.060 inch in diameter, and even when compressed upon separation of the lips of the duckbill, fluid flow is permitted through the foam. The foam also serves as a filter, to a certain extent.

It will be evident that the check valve 15 ensures that flow in the passage 7 is only in the direction shown by the arrow.

The fitting 2 has a central passage 17 connecting at its inner end with passage 28 through the check valve 15. The outer end portion 14 of the fitting 2 is shaped for connection with a fluid line. The other end 19 of the housing 1 is also shaped for connection with a fluid line.

The operation of the relief valve of FIGS. 1 and 2 is as follows. The fittings 14, 19 are connected to a fluid relief line. Duckbill 18 is held closed by the foam spring 13 during normal fluid line pressure. Whenever line pressure exceeds a predetermined minimum pressure in passages 7, 28, duckbill 18 opens against foam spring 13, and fluid escapes via passage 28 through the valve into passage 17 of fitting 2. A volume of fluid thus escapes, and the line pressure diminishes accordingly. When line pressure returns to normal, the duckbill 18 closes again, under the biasing force of foam spring 13. During normal line pressure, the foam spring 13 prevents leakage from the line through duckbill 18.

The valve shown in FIGS. 1 and 2 is shown at four times its normal size. The actual capacity of the passage chamber 28 within check valve 15, and passage 7 externally of the valve, can be as little as 0.1 cc, or even smaller.

Figures 3, 4:
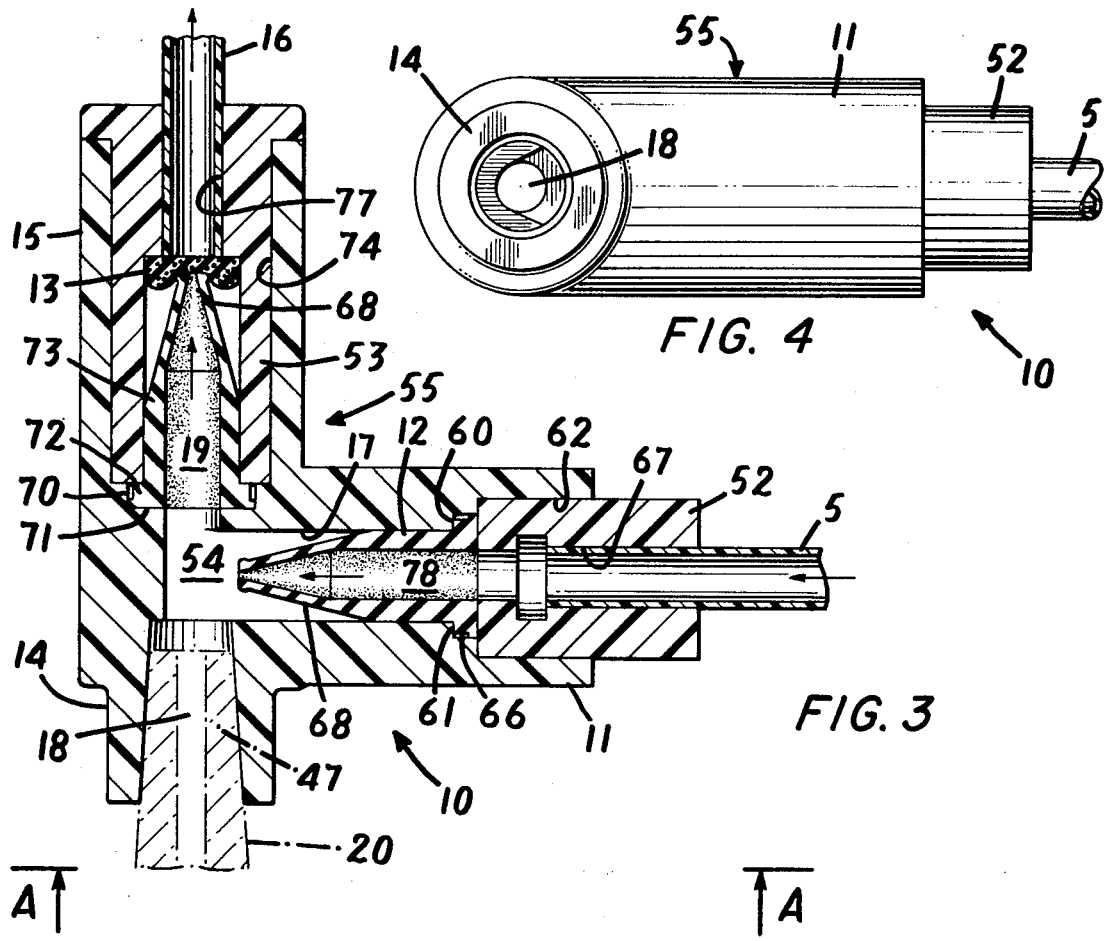
FIG. 3 is a view in cross-section of another embodiment of T-connector, employing twin duckbill valves.
FIG. 4 is an end view, taken along the line 4—4 of FIG. 3, and looking in the direction of the arrows.

The twin duckbill T-connector valve shown in FIGS. 3 and 4 has a coupling housing 40 that is molded in one piece entirely of plastic material, in this case, a polycarbonate resin, such as LEXAN, or a modified phenylene oxide resin, such as NORYL. However, other thermoplastic or thermosetting moldable or castable plastic materials can be employed, such as ethyl cellulose, cellulose acetate-butyrate, cellulose propionate, nylon, polyphenylene oxide, polyethylene, polypropylene, polytetrafluoroethylene (Teflon), polychlorotrifluoroethylene (Kel-F), polystyrene, polyvinyl chloride, polycarbonates, polyoxymethylene (Delrin), epoxide resins, urea-formaldehyde, melamine-formaldehyde, phenol-formaldehyde, 2-methyl-pentene polymers (TPX), and polyester resins.

The coupling body constitutes a unit made in three pieces, the housing 40, and two fitting inserts 52 and 53, all of which, as shown in the Figures, are bonded together by softened integration of the plastic with a solvent, at their adjoining contacting surfaces. The coupling housing 55 as shown is in a T-shape, with three legs, 41, 44 45, each of which bears a central passage 47, 48, 49, respectively, meeting at central chambers 54 of the housing. A T-shape has been adopted for convenience, but it will be evident that the configuration of the coupling is in no way critical. The three-passage-bearing legs thereof can be set in the angles of a Y, or at any desired angle other than the 90° angle shown in FIG. 3. The 90° angle is preferred, however, for reasons that will be apparent from the following discussion.

The central passages 47, 48 and 49 intersect at the central chamber 54 of the coupling housing. The coupling housing 40 at the outer end of the passage 47 has a reentrant portion 60 that defines a valve seat 61. Beyond the valve seat 61 is a wide bore 62 that extends to the exterior of the housing. A check valve 42 of the duckbill type is placed at the inner end of the bore 62 with the duckbill 68 facing inwardly from the valve seat 61, and with a base flange 66 abutting against the valve seat 61 in a leak-tight seal. The base flange 66 of the valve is locked in position in the valve seat 61 by the fitting insert 52, which fits snugly in the bore 62, with its external wall bonded thereto by way of a solvent-formed bond.

It will be appreciated that the fitting insert 52 can be held in the bore 62 by a press fit, and it can also be bonded therein by a suitable binder. The sides of the bore can be threaded, and the fitting insert 52 correspondingly threaded, so that it can be screwed tightly into the bore, in which event the check valve 42 can be removed for replacement. In the preferred embodiment, however, the fitting 52 is permanently fixed in the bore 62. In all cases, the fitting holds the flange 66 of the valve 42 tightly against the valve seat 61 in a leak-tight seal.

It will be evident that the check valve 42 ensures that flow in the passage 47 is only in the direction shown by the arrow.

The fitting 52 has a central passage 67 connecting at its inner end with passage 78 through the check valve 42. In the bore of passage 67 is bonded the end of tubing 35.

At the inner end of the passage 49 in arm 45 the housing 40 is formed with a reentrant portion 70, defining at its inner end a valve seat 71, against which is seated a flange 72 of a check valve 73, also of the duckbill type. This check valve faces outwardly, so that flow in the passage 49 proceeds only in the direction shown by the arrow.

The check valve 73 has the duckbill 68 enclosed snugly in a foam spring 13. In this case, the duckbill is tapered so as to have walls decreasing in thickness from the body towards the nip. The duckbill valves can be of any resilient or flexible heat-, water-, and solvent-resistant material, such as natural or synthetic rubber, for example, neoprene, or butadiene-styrene-acrylonitrile polymer, polypropylene, polyethylene, ethylenepropylene polymers, polyvinyl chloride or rubber hydrochloride resin. The foam spring is of a resilient open cell foam sheet material, with through pores, such as foam rubber, styrene-acrylonitrile rubber foam, polyethylene foam, polypropylene foam, silicone rubber foam, nylon foam, polyvinyl chloride foam, or polyether-based or polyester-based polyurethane foam. This spring tends to hold the duckbill 68 closed snugly, and it can open only by a fluid pressure sufficient also to compress the sponge, thus providing a higher fluid opening pressure than would otherwise be the case, and aiding in preventing leakage from a supply bottle through the valve 73. The foam is highly porous, with through pores, of the order 0.005 to 0.060 inch in diameter, and even when compressed upon separation of the lips of the duckbill, fluid flow is permitted through the foam. The foam also serves as a filter, to a certain extent.

Beyond the valve seat 71, the housing 40 widens, and defines a bore 74 extending to the exterior of the housing 40. Held within the bore in a snug fit is the fitting insert 53, the inner end of which abuts against the exterior face of the flange 72 of the check valve 73, and holds it tightly in position against the valve seat 71, in a leak-tight seal. The fitting insert 53 has an internal passage 77 through the check valve, and this passage receives the tubing 16, which is bonded therein.

The passage 48 does not contain a valve, and is adapted to receive in a press fit the delivery tip of the syringe S which pumps fluid through the T-connector. The syringe tip is shown in dashed lines in FIG. 3.

The operation of the T-connector of FIG. 3 is as follows. The delivery tip of a piston-type syringe 5 is pressed into passage 48 of arm 44. On the suction stroke the piston of the syringe on arm 44 draws fluid from the tubing 35 via passages 78, 47 into the interior chamber 54 of the housing 40 into the syringe, and then on the pumping stroke the piston pumps this fluid through passages 48, 54, and 49 into and through the tubing 46. Thus, a volume of fluid is drawn from the supply bottle equal to the capacity of the syringe attached to the arm 44, and then this volume is ejected via tubing 46 with each stroke on the piston. It will be evident that a lesser volume can be drawn, if desired, and that the volume is completely controllable by the user, according to the length of the stroke of the piston.

The device can similarly be used to withdraw fluid from a body cavity. In this event, the tubing 46 is attached to the fitting 52 of arm 41, and the tubing 35 attached to the fitting 53 of arm 45. Now, on the suction stroke, fluid is drawn out from the body cavity via tubing 46 and passages 47, 78, 54 and 48 and on the pumping stroke this fluid is pumped through passages 48, 54 and 49 into the tubing 35, and thence to the receiving bottle.

The device shown in FIGS. 3 and 4 is shown at four times its normal size. The actual capacity of the chamber 54, within check valve 73, externally of check valve 42, and externally of the syringe tip, including the volume of passages 47, 48 and 49, can be as little as 0.1 cc., or even smaller.

Figure 5:
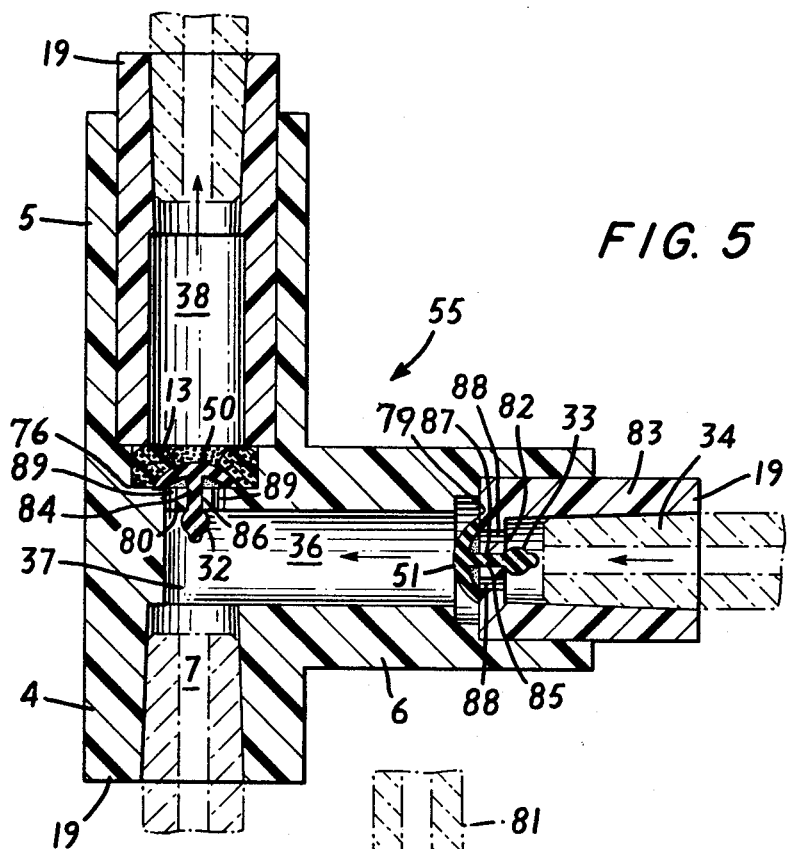
FIG. 5 is a view in cross-section of another embodiment of T-connector valve, employing umbrella valves.

FIG. 5 is a detailed view showing a coupling of the type of FIGS. 3 and 4 with umbrella valves in place of duckbill-type valves, in each of legs 56 of the housing 55. The valves 50 and 51 have umbrella tops, and base flanges 32 and 33 connected to the umbrella portion by legs 84 and 85. The valves are fitted in the passages 86, 87, defined by reentrant portion 80 of the housing 55 and the end 82 of the fitting insert 83. The external face of wall portion 80 is a valve seat 76, against which the umbrella top of the valve 50 seats, held by foam spring 13 thereagainst in a leak-tight seal. A similar valve seal 79 is formed on the inner face of the fitting insert 83. The valves 50, 51 are held in the passages 86, 87 by the flanged bases 32, 33 of the valves. The valves close off the passages 88, 89 only when the umbrellas of the valves are seated against their respective valve seats 76, 79. As a result, the valves control flow in the passages 34, 36, 37, 38, so that it proceeds only in the direction of the arrows.

In this T-connector, each of the legs 4, 5, 6 is provided with female Luer fittings 19.

Figure 6:
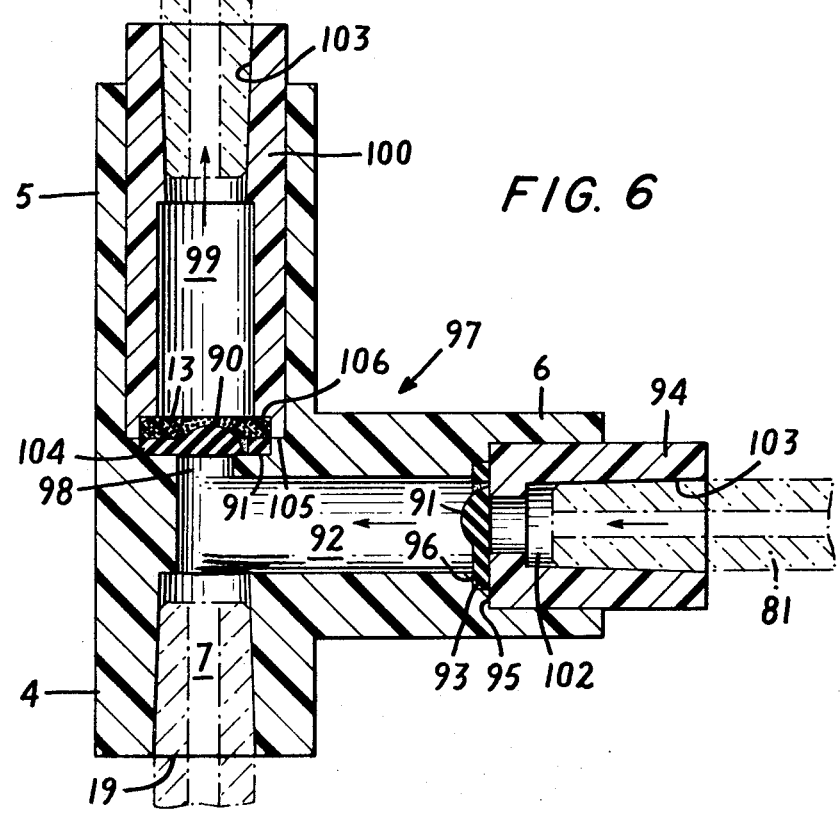
FIG. 6 is a view in cross-section of another embodiment of T-connector valve, employing flap valves.

FIG. 6 shows a coupling in which flap valves 90, 91 are employed. The flap valve 91 is free to open inwardly into the passage 92, and the flap valve is provided with a flange 93 which is held in place in a leak-tight seal by the inner face 95 of the fitting insert 94, in the recess 96 of the housing 97. Similarly, flap valve 90 disposed in passage 98 has a flange 104 which is held tightly in place by the inner face 105 of the fitting insert 100 in the recess 106, and the flap valve 90 is free to flap back and forth in the space afforded in the passage 99. The foam spring 13 is fitted in groove 106 in the wall of passage 99, and holds the valve 90 against its seat in a leak-tight seal. The flap valves control flow through passage 102 of fitting insert 94, and passages 92, 98 and 99, so that it proceeds only in the direction shown by the arrows.

The T-connector of FIG. 6 has sockets 103 in the legs 5, 6 into which tubing 81, shown in broken lines, may be inserted, and a female Luer fitting 19 in the leg 4.

The operation of the T-connector valves of FIGS. 5 and 6 is exactly the same as the T-connector valve of FIGS. 3 and 4.

While the arrangements shown of the valves in the arms and passages of the connectors are the preferred ones, so as to give the direction of flow shown in the Figures, it will be apparent that the valve or valves can be placed in any of the arms, for any desired direction of flow. The arrangement shown prevents the entrapment of air in the chamber of the coupling, and it also prevents the kinking of flexible hose or tubing which may be connected to the arms 2 and 3.

Any type of check valve can be employed in the relief valves and line valves and T-connectors of the invention. The duckbill-type of valve with duckbill tips shown in FIGS. 1 to 4 is preferred. There can also be employed, as indicated, poppet-type valves, umbrella-type valves, and flap-type valves.

The foam spring is useful to hold any of these types of valves snugly closed and thus prevent leakage at all pressures below a pre-determined minimum valve crack-open pressure. The spring is of resilient foam material and is interposed between the valve and the housing therefor in such a position that the valve cannot open without compressing the foam spring. Preferably, the foam material is under some compression when the valve is closed, so that it aids in keeping the valve in a closed position, in the manner of a spring.

When the valve opens, it compresses the foam material, and at the same time fluid comes into contact with the material, and must pass through it to escape from the valve. The material thus acts against an open valve with even greater resistance than against a closed valve; and this aids in closing the valve to a tight snug seal as soon as fluid pressure is reduced to below the crack-open pressure.

The desired effect can be obtained by filling the fluid passage downstream of the valve with a foam plug, which is in close abutment to the valve on the side which moves outwardly in opening the valve. Thus, the plug can surround the jaws of a duckbill valve, or engage the downstream face of a flap or umbrella valve. If the plug is retained under compression in this position by some means in the passage, such as a constriction, or a flange, it will tend to hold the valve closed, and will be further compressed when the valve opens.

The valves of the invention have the special feature of an extremely small volume, due to the construction of the valve and foam spring in a small housing. Due to the small volume, it is possible to draw fluid from any closed container without the need of venting the interior of the container, so as to relieve the vacuum that results. Due to the small internal volume (less than 1 cc. and preferably less than 0.1 cc.) a high compression ratio is obtained. This makes it possible to obtain pressures in a container of less than the vapor pressure of water and many other liquids. This means that no air need be introduced into a container to pump liquid out of the container.

In addition, it is possible to pump gasses out of a container until extremely low pressures are reached. For example, with a valve having 0.1 cc. internal volume and a 50 cc. syringe, it is possible to pump a gas out of a container until a vacuum of 1/500 atmosphere is reached. Moreover, it is possible using a valve in accordance with this invention to pump gasses with almost 100 percent volumetric efficiency.

In the form of a relief or check line valve, the housing can be made to connect to a fluid line at both inlet and outlet, using standard line connections. The relief valve can also have the outlet end open to the atmosphere. As a check or relief valve, a leak-tight seal is assured against pressure differentials up to the cracking open pressure by the foam spring, which can be made to resist pressure differentials from as little as 0.5 psi up to 500 psi.

The construction of the valve is such that it is possible to mold and cast the parts thereof from any plastic that is thermoplastic or thermosetting but in a moldable or castable stage of polymerization. The valve can in fact be made easily in one unit, in the case of and in line check or relief valve, from as few as three pieces, the housing, one valve, and one fitting insert or valve insert piece, and, in the case of a T-connector, three to seven pieces, the housing, one, two or three valves, and one, two, or three fitting inserts or valve insert pieces. If desired, the housing also can be made in sagittal halves, and bonded together with the valves and insert pieces in place. The several parts can be permanently bonded together, by heat-sealing, ultrasonic sealing, integration of adjoining parts by fusing or solvent-bonding, or by an adhesive or bonding agent.

It may also be possible in some cases to mold the housing in one piece, so that the valve or valves can be inserted in their respective passages and sealed in place, with the ends of the passages being molded in the shape needed for reception of the desired types of connections. This reduces the total number of pieces to two to four, and eliminates the fitting insert pieces shown in the drawings.

The resulting device is simple, and easy to handle and clean. It is so inexpensive that it can be discarded after one use, for sanitary reasons. Since it can be entirely of heat-resistant and solvent-resistant material, it can be sterilized before use, and stored in a sterilizer for a considerable period of time, if desired, without deleterious effect.

It is possible to fabricate a valve that is capable of withstanding the pressure necessary to pump from any type of container because the housing can be formed by a molding or casting technique from nonresilient plastic materials with walls of a thickness to resist any fluid pressures that are likely to be encountered. In this respect, the nonresilient or rigid valve of the invention is superior to valves which have employed as a component of the construction a flexible tubing which incorporates the valve or valves in connections to the pumping syringe or fluid supply.

Having regard to the foregoing disclosure, the following is claimed as the inventive and patentable embodiments thereof:

1. A T-connector valve comprising, in combination, a coupling body having three interconnected passages therethrough, a check valve in at least one of said passages movable between open and closed positions and controlling flow of fluid therethrough in a single direction, the check valve being of resilient material and self-biased towards a closed position, resiliently moving into an open position under a first predetermined forward fluid pressure, a resilient foam spring means arranged to hold the valve closed, and to be compressed when the valve opens, resiliently resisting opening of the check valve until a second predetermined forward fluid pressure is reached higher than the first predetermined forward fluid pressure, and means at an outer portion of each passage adapted for connection of said passage and the coupling to at least one member selected from the group consisting of a liquid medicament supply container, a fluid delivery device, and a syringe, the body being formed of plastic and holding the valves therein as one unit.

2. A T-connector valve in accordance with claim 1, in which the valve is a duckbill valve.

3. A T-connector valve in accordance with claim 2, having duckbill valves in two passages.

4. A T-connector valve in accordance with claim 1, in which the valve is an umbrella valve.

5. A T-connector valve in accordance with claim 1, in which the valve is a flap valve.

6. A T-connector valve in accordance with claim 1, comprising a coupling housing having in at least one valve-containing passage a fitting retaining the valve in the passage and having a passage therethrough connecting with the coupling housing passage at the inner end and the connection means at the outer end.

7. A T-connector valve in accordance with claim 6, having two check valves in two passages, and such fittings in each such valve-containing passage.

8. A T-connector valve in accordance with claim 6, wherein the fitting is secured to the coupling housing, and the coupling housing is in one piece.

9. A T-connector valve in accordance with claim 6, in which the coupling housing and fittings therein are bonded together.

10. A T-connector valve in accordance with claim 1, in which the passage for delivery of fluid is in alignment with the passage to which the syringe is attached, and the passage connected to the fluid supply is at right angles to said passages.

11. A T-connector valve in accordance with claim 1, in which the passages are provided with Luer fittings for connection to the medicament supply container and to the fluid delivery device.

12. A T-connector valve in accordance with claim 1, in which the interior volume of the coupling body between the valves is less than 1 cc.

13. A T-connector valve in accordance with claim 1, in which the coupling body is formed of molded plastic.

14. A T-connector valve in accordance with claim 1, in which the coupling body is made of a relatively rigid plastic.

15. A T-connector valve in accordance with claim 1, in which the passages are interconnected at a central portion of the body.

16. A T-connector valve for coupling a syringe to a liquid medicament supply, for delivery to a body via a fluid delivery device of a volume of liquid medicament in excess of the capacity of the syringe, comprising, in combination, a coupling body having three interconnected passages therein; a check valve in at least one of said passages controlling flow of fluid therethrough in a single direction, said check valve comprising a valve member of rubbery material fixedly held in the passage at one portion thereof in a leak-tight seal, and movable in a flex-action movement at a peripheral portion thereof to engage a valve seat or like valve member in a relatively leaktight planar seal, so as to close the passage, and to crack open in a flex-action movement with respect to the fixed portion away from the valve seat or like valve member so as to open the passage, the rubbery valve member presenting a surface responsive to fluid pressure on each side thereof, and being responsive to fluid pressure on one side tending to bias the valve member against the valve seat or like valve member in a leaktight seal therewith and thus prevent flow from that side, and being responsive to fluid pressure on the other side to move away from the valve seat or like valve member and thus permit flow from that side at the crack-open pressure and thereafter; a resilient foam spring means arranged to hold the valve closed, and to be compressed when the valve opens, and means in an outer portion of each passage adapted for connection of said passage and the coupling to at least one member selected from the group consisting of a liquid medicament supply container, a fluid delivery device, a syringe and interconnecting tubing, the valves being held permanently in the coupling body.

17. A T-connector valve for coupling a syringe to a liquid medicament supply for delivery to a body via a fluid delivery device of a volume of fluid medicament in excess of the capacity of the syringe, comprising, in combination, a coupling body having three interconnected smooth straight-sided passages therein; a check valve in at least one of said passages controlling flow of fluid therethrough in a single direction, said check valve comprising a valve member of rubbery material fixedly held in its passage at one portion thereof in a leaktight seal, and movable in a flex-action movement at a peripheral portion thereof to engage valve seat or a like valve member in the passage in a relatively leaktight seal and to crack open in a flex-action movement away from the valve seat or like valve member so as to open the passage in response to fluid pressure from one side; the through passages and valves when open together defining a smooth substantially uninterrupted flow path through the T-connector allowing the venting of all air therewith in at least one position of the T-connector; a resilient foam spring means arranged to hold the valve closed, and to be compressed when the valve opens, and means in an outer portion of each passage adapted for connection of said passage and the coupling to at least one member selected from the group consisting of a liquid medicament supply container, a fluid delivery device, a syringe, and interconnecting tubing.

18. A T-connector valve for coupling a syringe to a liquid medicament supply, for delivery to a body via a fluid delivery device of a volume of liquid medicament in excess of the capacity of the syringe, comprising, in combination, a coupling body of plastic material having three interconnected passages therethrough; a check valve in at least one of said passages controlling flow of fluid therethrough in a single direction, the check valve in at least one of said passages having retaining means at an outer peripheral portion thereof, a resilient foam spring means arranged to hold the valve closed, and to be compressed when the valve opens, a fitting insert in each valve-containing passage, comprising a plastic material which is either the same as or compatible with the plastic material of the coupling body, the fitting insert extending into the said passage from the outside of the coupling body, and having a central passage therethrough for passage of fluid into and out from the T-connector, said valve retaining means being retained by the fitting insert against the coupling body and a peripheral portion of the fitting insert closely abutting an inner wall of the passage, and being integrated with the plastic material of the coupling body, obliterating any seal therebetween at that portion, and forming a leaktight barrier, the fitting insert thus retaining the valve in the coupling body in a permanent leaktight fit; and means at an outer portion of each passage adapted for connection of said passage and the coupling to at least one member selected from the group consisting of a liquid medicament supply container, a fluid delivery device, a syringe, and interconnecting tubing.

19. A T-connector valve in accordance with claim 18, in which the coupling body and inserts are formed of the same plastic material.

20. A T-connector valve in accordance with claim 19, in which the coupling body is molded in one piece, in a T-shape, with three interconnected passages therethrough.

21. A T-connector valve in accordance with claim 19, in which the inserts are fitted in a recess in each passage so that the only surface thereof presented to fluid pressure are side wall surfaces of the internal passages therethrough.

22. A T-connector valve in accordance with claim 19, in which the check valves are each made of rubbery material, fixedly held in the passage at one peripheral retaining portion thereof engaging a valve seat or a like valve member, adapted to crack open in a flexaction movement away from the valve seat or like valve member so as to open the passage.

23. A T-connector valve for coupling a syringe to a liquid medicament supply, for delivery to a body via a fluid delivery device of a volume of liquid medicament in excess of the capacity of the syringe, comprising, in combination, a coupling body having three interconnected passages therein; check valves in two of said passages controlling flow of fluid therethrough in a single direction, said check valves each comprising a valve member of rubbery material fixedly held in the passage at one portion thereof in a leaktight seal, and at a peripheral portion thereof engaging a valve seat or a like valve member in a relatively leaktight seal, so as to close the passage, and adapted to crack open in a flex-action movement to a short distance away from the valve seat or like valve member, so as to open the passage; a resilient foam spring means arranged to hold the valve closed, and to be compressed when the valve opens, the total open volume of the flow passages within the T-connector, including the space into which the valves open, being less than about 1 cc.; and means in an outer portion of each passage adapted for connection of the passage and the coupling to at least one member selected from the group consisting of a liquid medicament supply container, a fluid delivery device, a syringe and interconnecting tubing; the body being formed of plastic, and the valves being held therein permanently as one unit.

24. A T-connector valve according to claim 23, in which the valves are duckbill valves.

25. A T-connector valve according to claim 23, in which the valves are umbrella valves.

26. A T-connector valve according to claim 23, in which the valves are flap valves.

27. A T-connector valve for coupling a syringe to a liquid medicament supply, for delivery to a body via a fluid delivery device of a volume of liquid medicament in excess of the capacity of the syringe, comprising, in combination a plastic coupling body having three interconnected passages therein; check valves in two of said passages controlling flow of fluid therethrough in a single direction, said check valves each comprising a valve member of rubbery material, having retaining means thereon held in a fixed position in its passage in a leaktight seal, and movable in a flex-action movement at a peripheral portion thereof to engage a valve seat or like valve member in a relatively leak-tight planar seal, so as to close the passage, and to crack open in a flex-action movement with respect to the fixed portion away from the valve seat or like valve member, said valve member presenting a surface exposed and responsive to fluid pressure on each side thereof and being responsive to a fluid pressure on one side tending to bias the valve member against the valve seat or like valve member in a leak-tight seal therewith and thus prevent flow from that side, and being responsive to fluid pressure on the other side to move away from the valve seat or like valve member and thus permit flow from that side at the crack-open pressure and thereafter; a resilient foam spring means arranged to hold the valve closed, and to be compressed when the valve opens, a fitting insert in each valve-containing passage of a plastic material which is the same as, or compatible with, the plastic material of the coupling body, the fitting insert extending into the said passage from the outside of the coupling body, and having a central passage therethrough for passage of fluid into and out from the T-connector, each fitting insert engaging the valve in its passage so as to capture the retaining means on the valve between the body and the insert, and having a peripheral sidewall abutting the side walls of the passage and being integrated with the plastic material of the coupling body there, obliterating any seam at that portion therebetween, and forming a leak-tight barrier, the fitting inserts thus retaining the valves in the coupling body in a permanent leak-tight fit, and means at an outer portion of each passage adapted for connection of said passage and the coupling to at least one member selected from the group consisting of a liquid medicament supply supply container, a fluid delivery device, a syringe, and interconnecting tubing.

28. A T-connector valve in accordance with claim 27, in which the total open volume of the flow passages within the T-connector including the space into which the valves open is less than 1 cc.

29. A T-connector valve in accordance with claim 27, in which the valves are duckbill valves having tapered walls diminishing in thickness from the neck to the bill of the valve.

30. A twin valve T-connector in accordance with claim 27, in which the through passages and valves when open together define a smooth substantially uninterrupted flow path through the T-connector, all of the open passages being straight-sided, allowing the venting of all air therewithin in at least one position of the T-connector.

31. A T-connector valve for coupling a syringe to a liquid medicament supply, for delivery to a body via a fluid delivery device of a volume of liquid medicament in excess of the capacity of the syringe, comprising, in combination, a coupling body having three interconnected passages therein; check valves in two of said passages controlling flow of fluid therethrough in a single direction, said check valves each comprising a valve member of rubbery material, having retaining means thereon held in a fixed position in its passage in a leak-tight seal, and movable in a flex-action movement at a peripheral portion thereof to engage a valve seat or valve like member in a relatively leak-tight planar seal, so as to close the passage, and to crack open in a flex-action movement with respect to the fixed portion away from the valve seat or like valve member, said valve member presenting a surface exposed and responsive to fluid pressure on each side thereof and being responsive to a fluid pressure on one side tending to bias the valve member against the valve seat or like valve member in a leak-tight seal therewith and thus prevent flow from that side, and being responsive to fluid pressure on the other side to move away from the valve seat or like valve member and thus permit flow from that side at the crack-open pressure and thereafter; a resilient foam spring means arranged to hold the valve closed, and to be compressed when the valve opens, a fitting insert in each valve-containing passage of a plastic material which is the same as, or compatible with the plastic material of the coupling body, the fitting insert extending into the said passage from the outside of the coupling body, and having a central passage therethrough for passage of fluid into and out from the T-connector, each fitting insert engaging the valve in its passage so as to capture the retaining means on the valve between the body and the insert, and having a peripheral sidewall abutting the side walls of the passage and being bonded with the material of the coupling body, forming a leaktight barrier, the fitting inserts thus retaining the valves in the coupling body in a permanent leaktight fit, and means at an outer portion of each passage adapted for connection of said passage and the coupling to at least one member selected from the group consisting of a liquid medicament supply container, a fluid delivery device, a syringe, and interconnecting tubing.

32. A valve which is useful in fluid lines to close off flow, but is adapted to open whenever fluid pressure upstream of the valve exceeds a predetermined minimum, comprising a resilient valve member movable between open and closed positions, and normally self-biased towards a closed position, resiliently moving into an open position under a first predetermined forward fluid pressure, and a resilient foam spring supplementing the selfbiasing force applied to hold the valve member closed and together with the self-biasing force resiliently resisting opening of the valve member until a second predetermined forward fluid pressure is reached that is higher than the first predetermined forward fluid pressure.

33. A valve in accordance with claim 32, in which the valve member is a duckbill member.

34. A valve in accordance with claim 32, in which the valve member is a flap member.

35. A valve in accordance with claim 32, in which the valve member is an umbrella member.

36. A valve in accordance with claim 32, disposed in a housing having an inlet and an outlet, the housing being adapted to receive a fluid line connection at the inlet and/or the outlet, and the valve member being interposed in the housing across the line of fluid flow between the inlet and outlet.

37. A valve in accordance with claim 36, in which the line pressure downstream of the valve is atmospheric.

38. A valve in accordance with claim 32, in which the foam spring is of foam plastic.

39. A valve in accordance with claim 32, in which the valve member and the foam spring are of plastic, and are disposed in a plastic housing.

40. A valve in accordance with claim 39, in which the valve member is held in place in the housing by an insert member.

41. A valve in accordance with claim 40, in which the insert member is bonded to the housing, to form an integral unit therewith.

* * * * *

UNITED STATES PATENT OFFICE
CERTIFICATE OF CORRECTION

Patent No. 3,710,942   Dated January 16, 1973

Inventor(s) David Rosenberg

It is certified that error appears in the above-identified patent and that said Letters Patent are hereby corrected as shown below:

On the Cover Sheet: "and a continuation-in-part of Ser. No. 787,539," should read -- and a division and continuation-in-part of Ser. No. 787,539, --.

Column 3, line 5: "value" should read -- valve --.

Column 7, line 61: "gasses" should read -- gases --.

Column 7, line 66: "gasses" should read -- gases --.

Column 10, line 41: "therewith" should read -- therewithin --.

Column 11, line 6, Claim 18: "seal" should read -- seam --.

Column 11, line 31, Claim 22: "flexaction" should read -- flex-action --.

Column 14, line 10, Claim 32: "selfbiasing" should read -- self-biasing --.

Signed and sealed this 20th day of August 1974.

(SEAL)
Attest:

McCOY M. GIBSON, JR.
Attesting Officer

C. MARSHALL DANN
Commissioner of Patents